United States Patent Office 3,371,150
Patented Feb. 27, 1968

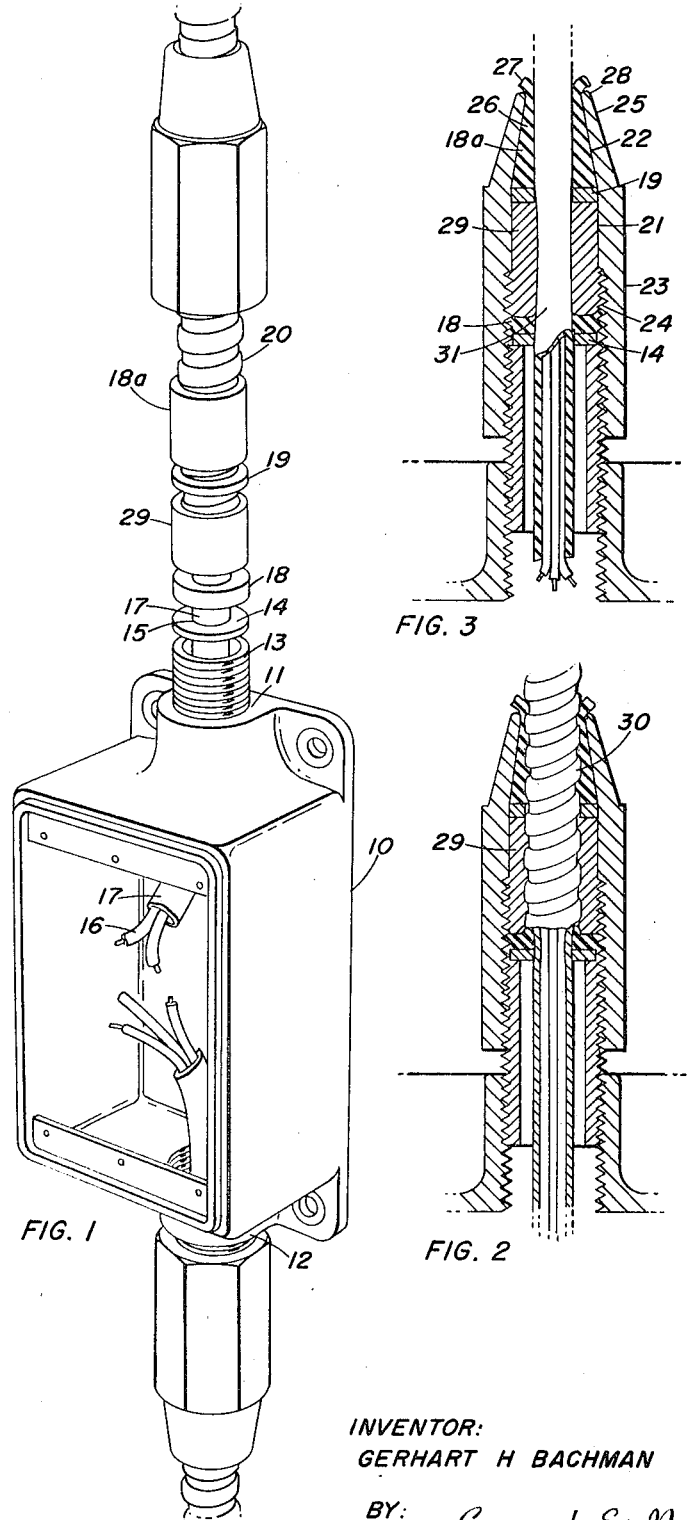

3,371,150
VAPOR PROOF CONNECTOR FOR UNDERGROUND ELECTRICAL LEADS
Gerhart Herman Bachman, 12 Hawkedon Crescent, Rexdale, Ontario, Canada
Filed Oct. 21, 1965, Ser. No. 499,700
Claims priority, application Canada, Sept. 28, 1965, 941,587
4 Claims. (Cl. 174—65)

ABSTRACT OF THE DISCLOSURE

This specification discloses a junction box intended to be embedded underground and having an externally threaded nipple projecting therefrom, together with a terminal connector comprising a fitting having an internally threaded portion at one end receiving the nipple and a conical portion at the other end, an abutment washer engaging the nipple, a deformable body in the fitting engaging the washer, and a second washer between the deformable body and the conical portion. The washers and deformable body have central openings accommodating a cable going to the junction box.

---

This invention relates to a vapour proof connector for underground electrical leads.

Prior explosion proof and dust ignition proof sealing connectors have been provided and embodying a deformable portion therein adapting to form a seal upon assembly with cable. Such prior designs are complicated and expensive. Such prior devices are generally characterized by a rubber bushing adapted to seat in a conical socket and to be depressed by a conical flange of a separate clamping part therefor. A cable sheath is then clamped by a separate clamping device such as a screw tightenable clamp or a split lead water seal again adapted to seat in an expensive conical seat and depressible by a further fitting having a co-operating conical recess flange. Such water-tight terminators are not water or gas proof in the area of the split lead conical ring for the split does seep gas and hydro-carbon vapours. This permits the rubber seal to deteriorate. In any event the expense of any one of the variety of prior sealing connector devices or terminators prohibits the general application thereof in such installations as electrical leads for gasoline pumps, high voltage power connecting leads into a household exposed entirely to the weather, underground household wiring exteriorly for lawn lighting and the like, or any electrical heating driveway connections for the elimination of snow.

It is the main object of this invention to provide a connector or terminator adapted for general usage by reason of its low cost and embodying standard connector threads and parts except for one special component of low cost.

Other objects of the invention will be appreciated by a study of the following specification taken in conjunction with the accompanying drawings.

In the drawings:

FIGURE 1 is a perspective view of a junction box to which the connector of the invention is applied in the communication of metal sheathed cable thereto.

FIGURE 2 is a sectional view of the upper connector of FIGURE 1 in assembled relationship with the junction box partially shown and as applied to a metal sheathed cable.

FIGURE 3 is a sectional view of the connector of the invention in a similar application to that of FIGURES 1 and 2 but wherein the cable is rubber sheathed.

The components necessary to the invention comprise, as a maximum, two rubber sealing bushings which are similar, two standard washers, one lead clamping or locking washer and a clamping fitting into which said bushings and washers assemble for threading of said fitting onto a standard male nipple, and as a minimum comprise a clamping fitting, one washer and one of said rubber bushings depending upon whether the invention is used for the sealing termination of rubber or plastic sheathed wire or cable of any of a variety of known sheathing designs.

In the drawings the conventional junction box 10 illustrated for the purpose of revealing one application of the invention embodies the threaded socket portions 11 and 12 adapted to receive a standard threaded male nipple 13 being a short length of tubing of uniform diameter having a uniform thread throughout the length thereof. A necessary component of the invention is provided in the form of the rigid abutment washer 14 preferably made of steel and of a diameter conforming to the root thread diameter of the male nipple 13. The hole 15 of washer 14 is of a diameter adapted to receive for free passage therethrough the connecting wire or wires 16 having thereon or forming a part thereof a covering hereinafter referred to as the inner cable 17. An annular gas sealing member preferably of rubber or other elastomer 18 is adapted to be compressed against the abutment washer 14 by the action of a clamping washer 19 made of a rigid material such as steel and adapted to pass about the cable sheathing 20 but of an outside diameter conforming to the thread root diameter of male nipple 13. As is evident in FIGURES 2 and 3 such clamping washer is adapted to be received within a smooth bore 21 for a slide fit therein and to abut against the inwardly directed conical surfaces 22 forming a portion of the inner surfaces of the clamping fitting 23 having inner threads 24 adapted to mate with the threads of the nipple 13. Thus elastomer gas sealing member 18 while shown as a single member of a thickness of the order of about one-third its outer diameter may be provided in tubular form and cut off to a length to suit for insertion between the clamping washer 19 and the abutment washer 14. Further a similar length of such elastomer tubing or member may be inserted in the constricted section 25 having the inward conical surfaces 22 prior to insertion of the ram acting clamping washer 19 therein whereby upon tightening of the fitting 23 on to the male nipple 13 the same becomes compressed as at 26 to express a portion 27 thereof about the outer terminal end 28 of the fitting to protect against weather moisture dampness and provide for a gas seal.

In general however it will be preferred to also employ a lead clamping bushing 29 being a suitable length of lead tubing having no split therein and of a diameter adapted for a slide fitting within the inner bore surface 21 of the clamping fitting 23. Preferably also the assembly may be tightened initially without including the elastomer gas sealing member 18 and then disassembled after deformation of the lead sleeve and the elastomer tube 18a for placement of the gas seal member 18 and reassembly and final tightening. It is to be observed that on a metal sheathed cable having a metal sheathing 30 as shown in FIGURE 2 the lead clamping bushing 29 will be deformed to clamp tightly about the sheathing thus locking the sheathed cable relative to the junction box 10. Also in FIGURE 3 the lead bushing 29 will be deformed to press inwardly over the rubber sheathed cable 31.

It will be apparent that the invention provides a useful and simple means for accomplishing a gas and moisture seal while enabling a firm clamping of a cable to a junction box or other wiring terminal fitting or terminus. The elastomer gas seal members also accomplish a substantial degree of moisture sealing and in fact may be regarded as substantially essential to a satisfactory sealing function. The clamping function is accomplished by the deformable lead bushing although in some instances the elimination of either the elastomer sealing member or the clamping bushing may be permitted. The provision of an elastomer sealing member in the region of the outward end of the clamping fitting enables this critical region to be sealed against exterior effects and is not intended primarily as a sealing against interior effects. Further such sealing at this location serves to space the cable from the clamping fitting itself to avoid abrasion and wear at the point where the cable enters the clamping fitting.

It is intended that the present disclosure should not be construed in any limiting sense other than that indicated by the scope of the following claims.

What I claim is:

1. In combination with a junction box having an externally threaded nipple of a predetermined thread root diameter and having a free end, a terminal connector comprising: a clamping fitting of tubular cylindrical construction throughout the major part of its extent and formed with an internally threaded portion at one end receiving said threaded nipple and a reduced conical portion at its other end; said nipple extending externally of said junction box, an abutment washer having an outer diameter substantially equal to the thread root diameter of said nipple and a central opening to accommodate the passage of a cable therethrough, said washer being in abutting engagement with the free end of said nipple, a cylindrically shaped deformable tubular body in said fitting in abutting engagement with said washer, said deformable body having an outer diameter substantially equal to said thread root diameter; and a second washer interposed between the other end of said deformable body and the larger end of said conical portion, said tubular body and conical portion accommodating the passage of a cable therethrough, said deformable body being subject to clamping action by threading of said fitting on said nipple to seal and clamp a cable passing through said fitting and nipple.

2. The combination of claim 1 together with a second deformable body of a material different from said first mentioned deformable body and disposed in said cylindrical portion of said fitting between said first mentioned deformable body and said second washer.

3. The combination of claim 1 in which said deformable body is of an elastomer together with a second deformable body of lead in said fitting between the elastomer body and said second washer.

4. The combination of claim 1 together with a deformable body in said conical portion of said fitting and having a central passage accommodating a cable passing therethrough.

References Cited
UNITED STATES PATENTS

| | | | |
|---|---|---|---|
| 2,076,261 | 4/1937 | Bauroth | 174—65.1 |
| 2,564,302 | 8/1951 | Fraser | 174—65.1 |
| 3,055,972 | 9/1962 | Peterson | 174—65.1 |

DARRELL L. CLAY, *Primary Examiner.*

L. H. MYERS, *Examiner.*

D. A. TONE, *Assistant Examiner.*